(12) United States Patent
Kamitakahara et al.

(10) Patent No.: US 8,443,408 B2
(45) Date of Patent: May 14, 2013

(54) METHOD AND SYSTEM FOR MANAGING BANDWIDTH

(75) Inventors: Lisa Etsuko Kamitakahara, Toronto (CA); Antonio Colantonio, Mississauga (CA); Sandip Singh, Brampton (CA); Nasir Mahmood Ansari, Mississauga (CA); Clinton Alexander Pierce Sheridan, Barrie (CA)

(73) Assignee: Rogers Communications Inc., Toronto, Ontario (CA)

( * ) Notice: Subject to any disclaimer, the term of this patent is extended or adjusted under 35 U.S.C. 154(b) by 71 days.

(21) Appl. No.: 13/230,112

(22) Filed: Sep. 12, 2011

(65) Prior Publication Data

US 2013/0067523 A1    Mar. 14, 2013

(51) Int. Cl.
*H04N 7/173* (2011.01)
(52) U.S. Cl.
USPC .............. 725/93; 725/35; 725/86; 370/351
(58) Field of Classification Search .......... None
See application file for complete search history.

(56) References Cited

U.S. PATENT DOCUMENTS

| | | | |
|---|---|---|---|
| 6,859,839 B1 * | 2/2005 | Zahorjan et al. ............... | 709/231 |
| 7,373,653 B2 * | 5/2008 | Pei et al. ........................ | 725/95 |
| 7,516,232 B2 * | 4/2009 | Barrett et al. ................. | 709/231 |
| 7,698,724 B1 * | 4/2010 | Day .............................. | 725/97 |
| 2008/0098446 A1 * | 4/2008 | Seckin et al. ................. | 725/114 |
| 2008/0155612 A1 * | 6/2008 | Ikeda et al. ................... | 725/87 |
| 2008/0235744 A1 * | 9/2008 | Hong et al. ................... | 725/109 |
| 2009/0044242 A1 * | 2/2009 | Ramakrishnan et al. ..... | 725/118 |
| 2009/0100459 A1 * | 4/2009 | Riedl et al. .................... | 725/35 |
| 2009/0150933 A1 * | 6/2009 | Lee et al. ....................... | 725/40 |
| 2010/0103950 A1 * | 4/2010 | Statelov et al. ............... | 370/468 |

FOREIGN PATENT DOCUMENTS

WO        03103292 A1    12/2003

OTHER PUBLICATIONS

PCT International Search Report and Written Opinion relating to application No. PCT/CA2011/050549 dated May 14, 2012.

* cited by examiner

*Primary Examiner* — Pankaj Kumar
*Assistant Examiner* — Timothy Newlin
(74) *Attorney, Agent, or Firm* — Rowand LLP

(57) ABSTRACT

A bandwidth management system, receiver, and method of managing bandwidth in a content delivery system are described. In one embodiment, the method includes: identifying two or more content items which are associated with at least some common content and which are temporally related; determining a relative priority of the least some of the identified content items; and allowing a receiver requesting the content associated with a lower priority content item to access a multicast associated with a higher priority content item.

16 Claims, 8 Drawing Sheets

METHOD AND SYSTEM FOR MANAGING BANDWIDTH

TECHNICAL FIELD

The present disclosure relates to content delivery systems and, more particularly, to methods and systems for managing bandwidth in content delivery systems.

BACKGROUND

Content delivery systems such as cable television systems, satellite television systems and Internet protocol television systems (IPTV) often deliver content, such as television programming from a head end system which is operated by a service provider to one or more receivers operating within the content delivery system.

Such content delivery systems often have a limited amount of bandwidth available to deliver content. For example, wireless content delivery systems such as satellite television systems may be required to deliver signals within a specific portion of the wireless spectrum. Similarly, wired content delivery systems, such as cable television systems, operate over a wired transmission medium which has a finite amount of usable bandwidth.

The availability of bandwidth for content delivery may be further limited where service providers provide other services in addition to content delivery system services. For example, service providers may operate a voice communication service and/or an Internet service over a transmission medium which they also use for content delivery system services (such as television delivery services). Each of these services may require bandwidth in the transmission medium, thus reducing the overall availability of bandwidth in the transmission medium.

Thus there exists a need for systems and methods of managing bandwidth in content delivery systems.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present disclosure describes a method of managing bandwidth in a content delivery system. The method comprises: identifying two or more content items which are associated with at least some common content and which are temporally related; determining a relative priority of the least some of the identified content items; and allowing a receiver requesting the content associated with a lower priority content item to access a multicast associated with a higher priority content item.

In another aspect, the present disclosure describes a bandwidth management system. The bandwidth management system includes at least one processor and a memory coupled to the at least one processor. The memory has stored thereon processor executable instructions which, when executed by the processor cause the processor to: identify two or more content items which are associated with at least some common content and which are temporally related; determine a relative priority of the least some of the identified content items; and allow a receiver requesting the content associated with a lower priority content item to access a multicast associated with a higher priority content item.

In yet another aspect, the present disclosure describes a receiver. The receiver includes an input mechanism and at least one processor. The receiver also includes a memory coupled to the at least one processor. The memory has stored thereon processor executable instructions which, when executed by the processor cause the processor to: in response to receiving a request for content associated with a first virtual channel from the input mechanism, providing content associated with a second virtual channel.

Other example embodiments of the present disclosure will be apparent to those of ordinary skill in the art from a review of the following detailed description in conjunction with the drawings.

Example Wired Television System

Figure 1:
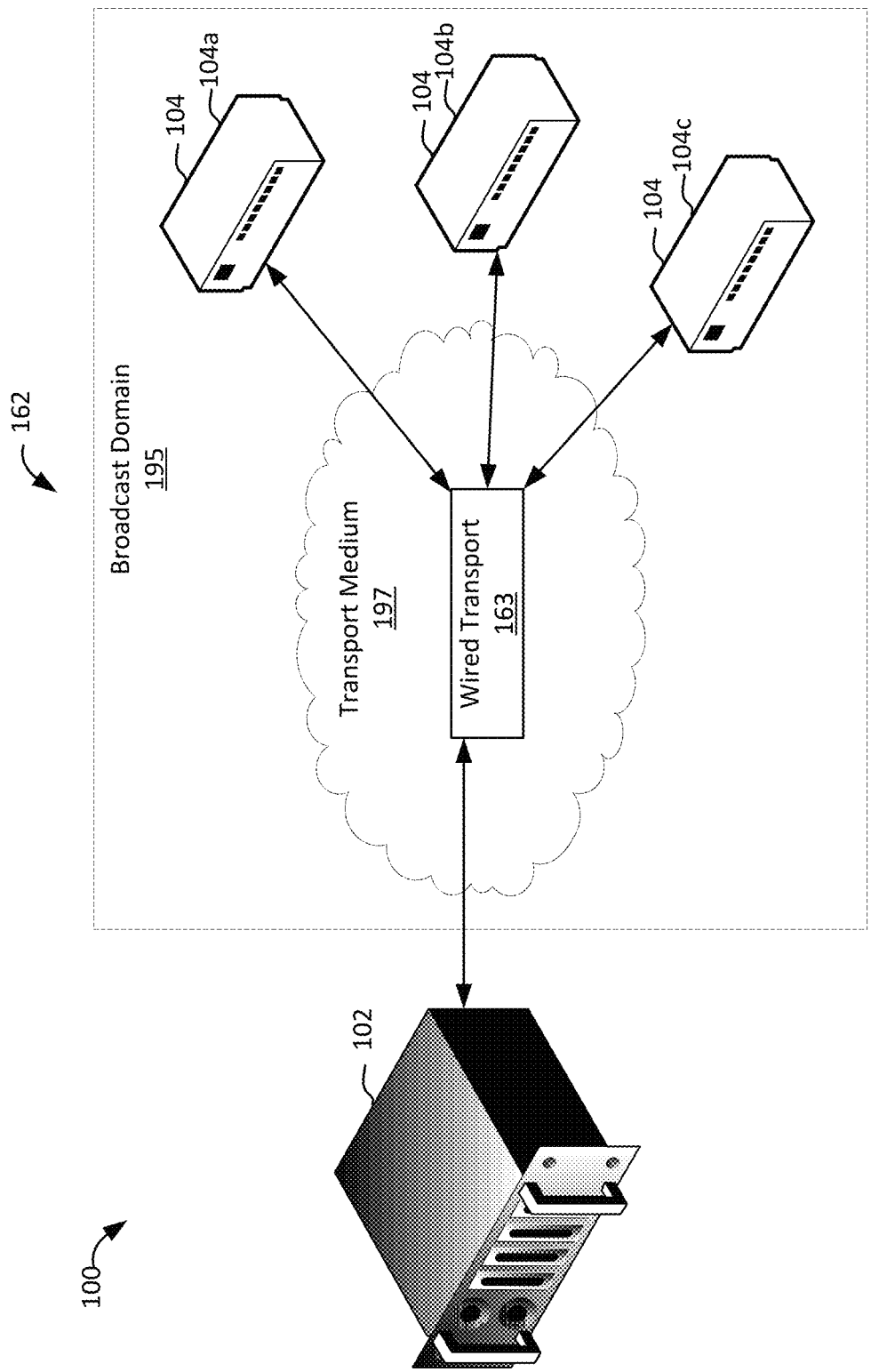
FIG. 1 is a system diagram of an example content delivery system in accordance with example embodiments of the present disclosure.

Referring now to FIG. 1, a block diagram of an example content delivery system 100 is illustrated in which example embodiments of the present disclosure may be applied. The content delivery system 100 is configured to deliver content from a content source system to a content destination system.

In the example embodiment illustrated, the system from which content is delivered (i.e. the content source system) is referred to as a head end system 102 and the system receiving the content (i.e. the content destination system) for presentation on a media player (such as a television), is referred to as a receiver 104. In at least some example embodiments, the content delivery system 100 is a broadcast television system which delivers television content such as broadcast television shows. The content delivery system 100 is configured to deliver content over a broadcast or multicast domain 195 (which, for simplicity, will be referred to as a broadcast domain 195). The broadcast or multicast domain 195 includes a plurality of receivers 104. In the embodiment illustrated in FIG. 1, the broadcast domain 195 includes a first receiver 104a, a second receiver 104b, and a third receiver 104c. The first receiver 104a, second receiver 104b and third receiver 104c are connected to the head end system 102.

The content delivery system 100 may provide a subscription based content delivery service in which each receiver 104 operating in the content delivery system 100 may be associated with a subscriber to the content delivery system 100. Each subscriber may be authorized to view specific content. For example, each subscriber may be authorized to view a specific set of broadcast streams associated with channels which the subscriber subscribes to. The content delivery system 100 may deliver content to a plurality of subscribers associated with a plurality of receivers 104.

The head end system 102 may be owned and/or operated by a content service provider including a television service provider such as a cable television service provider and/or a satellite television service provider. The head end system 102 broadcasts or multicasts content (such as television programming) to a plurality of receivers 104 located within a broadcast or multicast domain 195. Multicasting content refers to sending content to two or more receivers 104. Broadcasting content refers to sending content throughout the broadcast domain 195. Since such a broadcast may be received by two or more receivers, the term multicasting as used herein may also include broadcasting.

The receivers 104 are typically located in a location associated with subscriber, such as, for example, the home of a subscriber. Accordingly, in at least some example embodiments, the receivers 104 may be referred to as Customer Premises Equipment (CPE). The receivers 104 may be connected to a media player, such as a television, on which content received at the receiver 104 may be displayed. In at least some example embodiments, a receiver 104, or parts thereof, may be internal to a media player (e.g. the television). For example, a receiver 104 may be a component of a television which is included in the television at the time of manufacture. In other embodiments, a receiver 104 may be an external receiver 104 which is connected to the media player (e.g. the television) through a wired or wireless transport medium.

The plurality of receivers 104 operating within the broadcast domain 195 may include, in at least some example embodiments, one or more set top boxes. A set top box is a device which connects to a television (or other display) and an external source of signal, turning the signal into content which may be displayed on the television (or other display). The term set top box includes devices which do not, necessarily, sit on top of a television. That is, the term set top box may refer to any device which is external to a television (or other display) and which receives an external signal, turns the signal into content and displays the signal on the display.

The receivers 104 operating within the broadcast domain 195 may also take other forms including, for example, a gaming console, a cable card, a personal computer, a tablet device, a smartphone, etc. The receivers 104 may be any electronic devices at which content from a head end system 102 may be received.

The receivers 104 are connected to the head end system 102 through a transport medium 197 which may, in various embodiments, be a wired transport medium (such as coaxial cable and/or fibre optic cable) or wireless transport medium 197 (such as radio frequency (RF) based transport mediums). Depending on the transport medium 197 used to transport the content from the head end system 102 to receivers 104, the content delivery system 100 may, in various embodiments, be a wired television system 162 (FIG. 1), such as a cable television system, which delivers content to the receiver 104 over a wired transport 163 (such as coaxial cable and/or fibre optic cable), or a satellite television system 154 (FIG. 2) which delivers content to the receiver 104 over a satellite transport 155. The content delivery system 100 may also be based on other broadcast or multicast based content delivery technologies and transport mediums apart from those specifically discussed herein.

In FIG. 1, the content delivery system 100 is a wired television system 162, such as a cable television system. The head end system 102 and the receivers 104 operating within the broadcast domain 195 are connected via a wired transport 163. The wired transport 163 may include a cable. The wired transport 163 may, in various embodiments, include copper or other wires such as coaxial cable and/or may include an optical transport medium, such as fibre optic cables.

The head end system 102 and the receivers 104 are configured to permit downstream communications to the receivers 104 through respective transport mediums and protocols. More particularly, the head end system 102 and the receivers 104 are configured to permit content, such as television content, to be delivered to the receivers 104 for display on media players (such as a television) associated with respective receivers. Where the content delivery system 100 is a wired television system 162, such as a cable television system, the head end system 102 may deliver content to the receiver 104 through the wired transport 163.

In at least some example embodiments, the content delivery system 100 provides for upstream communications from one or more of the receivers 104 to the head end system 102. In at least some example embodiments, upstream communications (i.e. communications originating from a receiver 104 which are sent to the head end system 102) may operate on the same transport medium 197 and/or transport protocol as the downstream communications (downstream communications are communications originating from the head end system 102 which are sent to one or more receiver 104). For example, in a wired television system 162 such as a cable television system, communications originating from a receiver 104 may be sent to the head end system 102 through the wired transport 163. As will be illustrated in the example content delivery system 100 of FIG. 2, in at least some embodiments, the receiver 104 may be configured to send upstream communications over a different transport medium than the transport medium from which downstream communications are received.

Accordingly, the head end system 102 and the receivers 104 used in the content delivery systems 100 described above (i.e. the satellite television system 154 and the wired television system 162) provide for downstream communications from the head end system 102 to the receivers 104. In at least some example embodiments, the head end system 102 and the receivers 104 are also configured to provide upstream communications from the receivers 104 to the head end system 102. Such upstream communications may permit the receivers 104 to communicate with the head end system 102. Such upstream communications may, for example, be useful to provide on-demand services to a receiver 104, such as video on-demand services (which may be used to deliver specific video content on request), audio on-demand services (which may be used to deliver specific audio content on request) or application on-demand services (which may be used to deliver specific applications on request) to a receiver 104.

Example Satellite Television System

Figure 2:
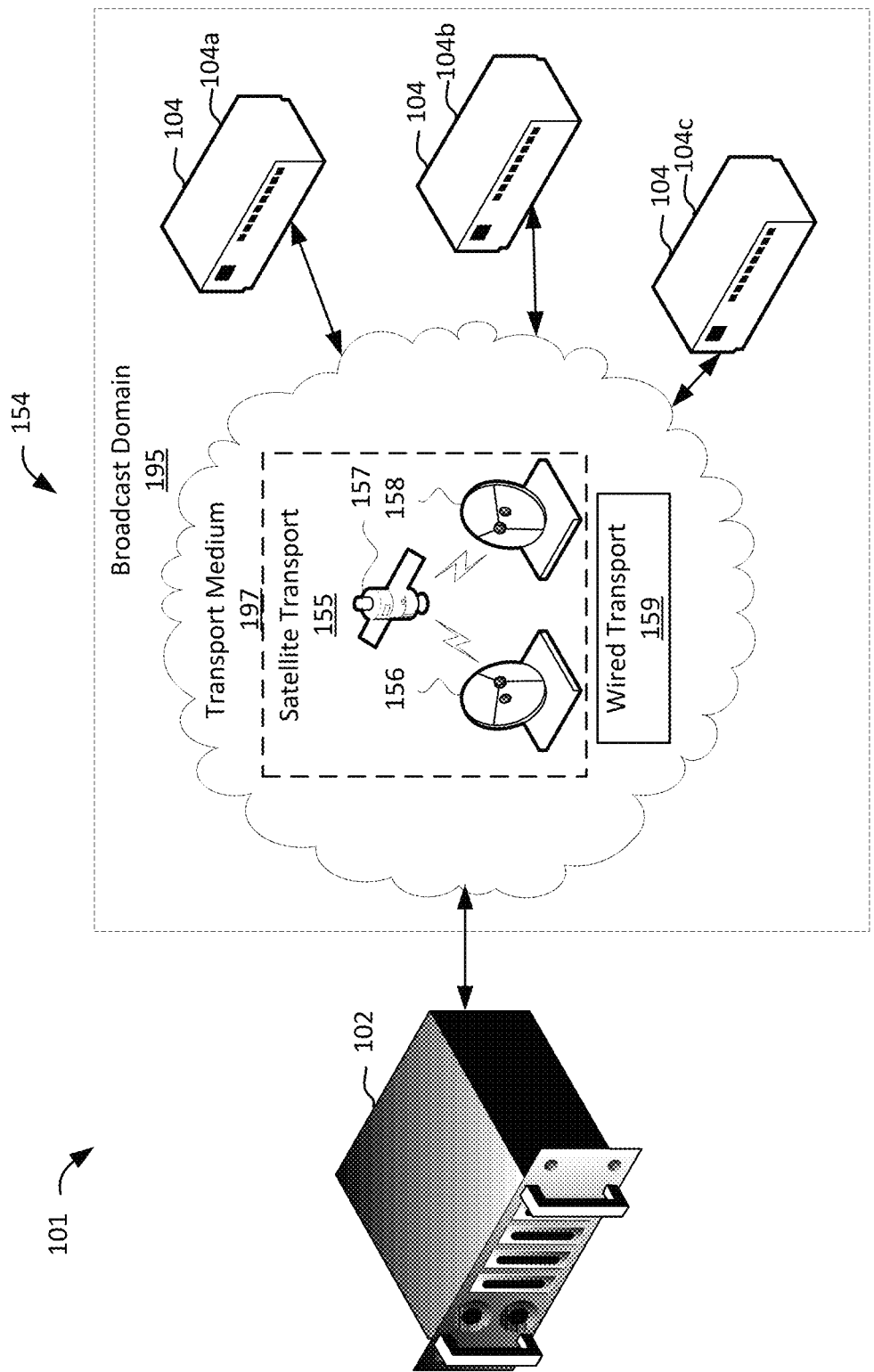
FIG. 2 is a system diagram of an example content delivery system in accordance with example embodiments of the present disclosure.

Referring now to FIG. 2, an example content delivery system 101 according to other example embodiments of the present disclosure is illustrated. The content delivery system 101 of FIG. 2 illustrates a satellite television system 154. The content delivery system 101 of FIG. 2 includes a head end system 102 which is connected to a plurality of receivers 104 via a transport medium 197. The head end system 102 and the receivers 104 may be of the types described above with respect to the content delivery system 100 of FIG. 1.

In the satellite television system 154, the head end system 102 may be configured to deliver content to receivers 104 operating within the broadcast domain 195 via a satellite transport 155. The satellite transport 155 may include a satellite uplink 156 connected to the head end system 102. The satellite uplink 156 (which may include a satellite dish) transmits data (including content) to a satellite 157 placed in orbit around the earth. The satellite 157 then transmits content to a receiver 104 through a satellite downlink 158 (which may include a satellite dish) connected to the receiver 104.

The satellite television system 154 may also allow for upstream communications from one or more receivers 104 to the head end system 102. In some such embodiments, communications originating from a receiver 104 may be sent to the head end system 102 through the satellite transport 155.

In other example embodiments, upstream communications (i.e. communications originating from the receiver 104 which are sent to the head end system 102) may operate on a different transport medium and/or transport protocol as the downstream communications (i.e. communications originating from the head end system 102 which are sent to one or more receiver 104). By way of example, in at least some embodiments, the satellite downlink 158 may capable of receiving data from the satellite 157 but may not be capable of sending data to the satellite 157. In such embodiments, upstream communications from the receiver 104 to the head end system 102 may be provided through an alternative transport medium such as a wired transport medium 159. In at least some embodiments, the wired transport medium 159 used for upstream communications in the satellite television system 154 comprises twisted pair wiring. In some embodiments, the wired transport medium 159 used for upstream communications may be a transport medium over which packet based communications may be transmitted. For example, the wired transport medium 159 may be any transport medium providing a connection to the Internet.

Accordingly, in at least some example embodiments, the receiver 104 and/or the head end system 102 of a content delivery system 100 (FIG. 1), 101 (FIG. 2) may be configured to communicate with one another over a wired transport medium which may include, for example, a coaxial transport medium, an optical transport medium (such as fibre optic cable), a twisted pair transport medium such as telephone cable (including, for example, a category 1 cable (Cat 1)) or an Ethernet cable (including, for example, a category 5 cable (Cat 5) or category 6 cable (Cat 6)) which may connect to the head end system 102 through a network, such as the Internet. Similarly, in some embodiments, the receiver 104 and/or the head end system 102 may be configured to communicate with one another over a wireless transport medium such as a radio frequency transport medium (including satellite based communications and/or WiFi).

Example Head End System

Figure 3:
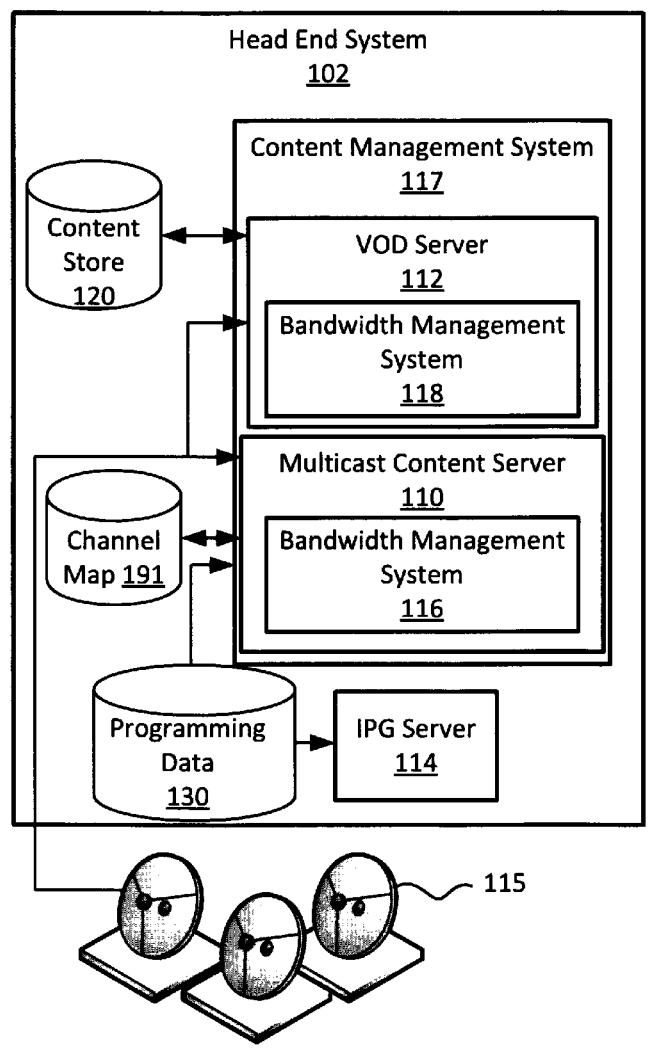
FIG. 3 is a block diagram of an example head end system for use with a content delivery system such as the content delivery systems of FIGS. 1 and 2.

As noted above, the content delivery system 100 (FIG. 1), 101 (FIG. 2) includes a head end system 102. Referring now to FIG. 3, a block diagram of an example head end system 102 is illustrated. The head end system 102 is configured to gather content (such as programming sources including source broadcast streams), decode, select and/or retransmit such content (such as video programming) to a distribution network, which includes one or more receivers 104. The content which is delivered to the head-end-system 102 may include, for example, broadcast or multicast content (such as broadcast video) and on-demand content (such as pay-per-view content, including movies, special events, and other on-demand content). The broadcast or multicast content which is delivered to the head end system 102 for broadcasting and/or multicasting live to receivers may be referred to as source broadcast streams.

The head end system 102 may include or connect to a content acquisition system 115. The content acquisition system 115 of FIG. 3 is illustrated as a plurality of satellite dishes. Such satellite dishes may be configured to receive content from one or more satellites. In various embodiments, the content acquisition system 115 may be configured to receive content through other means instead of, or in addition to, the satellite dishes. For example, the content acquisition system 115 may include one or more antennas which receive radio frequency signals, such as signals transmitted through a terrestrial based network. In at least some embodiments, the content acquisition system 115 may be configured to receive content through a network, such as the Internet. In at least some embodiments, the content acquisition system 115 may be configured to receive content though a wired transport medium such as, for example, a cable. The cable may, in some example embodiments, include a coaxial cable and/or a fibre optic cable. The content received through the content acquisition system 115 may include, for example, broadcast content which may be received in streaming fashion from one or more television networks. Such content may be referred to as source broadcast streams.

In at least some example embodiments, the head end system 102 includes a content management system 117 which is configured to manage content received at the head end system 102 and/or deliver content to one or more receivers 104. The content management system 117 may, in various embodiments, be configured to perform any one or more of the following tasks: gather content (such as programming sources) received from the content acquisition system 115, decode such content, select content for retransmission, encrypt content for transmission to the receivers, store content in the content store and/or transmit content to the receivers.

In order to prevent unauthorized access to content (such as source broadcast streams), such content may be scrambled or otherwise encrypted. The head end system 102 may receive scrambled and/or encrypted content (such as encrypted source broadcast streams). Such encrypted and/or scrambled content may, for example, be received at the content acquisition system 115. The head-end system 102 may be configured to decrypt or decode such content. In at least some example embodiments, the content management system 117 of the head end system 102 may be configured to perform such decryption and/or decoding.

The head end system 102, in at least some embodiments, includes a content store 120 for storing content on the head end system 102. The content store 120 may be comprised of computer based storage and may also be referred to as memory. In some example embodiments, the memory includes non-volatile memory, such as flash memory. In at least some example embodiments, the memory includes a solid state drive (SSD) and/or a magnetic storage, such as a hard disk drive (HDD). Other types of memory may be included in the storage instead of or in addition to those listed above.

In at least some example embodiments, the content management system 117 is configured to store at least some received content in the content store 120.

The content which is stored in the content store 120 may, for example, include on-demand content, such as video on-demand content. Video on-demand content is video content which may be sent to a receiver 104 upon request from that receiver 104. That is, video on-demand is a service which allows viewers (i.e. subscribers) to receive and play video at their convenience. That is, video is delivered to a subscriber's receiver in response to a request being received from the subscriber. Such a request may be received via upstream communications from the receiver 104 to the head end system 102.

The content which is stored in the content store 120 may include other on-demand content such as, for example, audio on-demand content and/or application on-demand content. Audio on-demand content may include audio files, such as music files, which may be delivered to a receiver 104 upon request from that receiver 104. Similarly, application on-demand content may include applications, such as games, utilities, etc., which may be delivered to a receiver 104 upon request from that receiver 104.

The head end system 102 may transmit content, such as video to subscribers over a network. In at least some embodiments, prior to such transmissions, the head-end system 102 may encrypt the signal using its own encryption algorithm in order to prevent unauthorized access to the signal, such as eavesdropping and theft of service. In at least some example embodiments, the content management system 117 of the head end system 102 may include subsystems and modules which are configured to perform or facilitate such transmission, formatting, modulation and/or encryption of content.

The content management system 117 of the head end system 102 may be configured to utilize digital technology to deliver digital content, such as video signals. Digital video signals are signals which use digital video compression. In at least some embodiments, the content management system 117 may be configured to encode and transmit video signals according to a Quadrature Amplitude Modulation (QAM) format. QAM is a modulation format which does not specify the format of the digital data being carried. The format of the data being carried may, in at least some example embodiments, be based on an Advanced Television Systems Committee (ATSC) standard. In other some embodiments, the content management system 117 may be configured to use a Digital Video Broadcasting (DVB) based data format, such as Digital Video Broadcasting-Cable (DVB-C), to format the data being carried (such as video signals). In at least some example embodiments, the head-end system 102 may be configured to transmit data formatted according to a Motion Pictures Experts Group (MPEG) standard, such as an MPEG-2 or MPEG-4 digital audio/digital video stream. In at least some example embodiments, the content management system 117 may be configured to use QAM modulation on such data.

Other data formats or modulation formats may be used to format or transmit content streams, including, for example, variations and evolutions of the standards discussed above. By way of example, in at least some embodiments, a second generation Digital Video Broadcasting-Cable (DVB-C2) format may be used.

The head end system 102, in at least some embodiments, includes an on-demand server, such as a video on-demand (VOD) server 112. The on-demand server may, in at least some example embodiments, be included in the content management system 117 of the head end system 102. The on-demand server, such as the VOD server 112 may be configured to receive a request from a receiver 104 (i.e. via upstream communications from the receiver 104) to deliver content such as, for example, movies and other video, to the receiver 104. The request includes unique identification information which allows the VOD server 112 to determine which content is associated with the request. The VOD server 112 (or other on-demand content server) may retrieve the specified content from the content store 120 and deliver such content to the receiver 104. Since the VOD server 112 delivers the requested content only to the receiver 104 which requested it, the VOD server 112 may be referred to as a unicast server in at least some embodiments.

The head end system 102, in at least some example embodiments, includes other content servers instead of or in addition to the on-demand server described above. For example, in at least some example embodiments, the head end system 102 may include a multicast content server 110. In the example embodiment of FIG. 3, the multicast content server 110 is included within the content management system 117.

The multicast content server 110 may be configured to deliver content to two or more receivers 104. That is, the multicast content server 110 is configured to multicast or to broadcast content to two or more receivers 104. In at least some embodiments, the multicast content server 110 may be configured to broadcast content. In such embodiments, the multicast content server 100 may also be referred to as a broadcast content server.

The multicast content server 110 may deliver broadcast content from the head end server 102 to a plurality of receivers 104 in the broadcast domain 195. The content which is delivered by the multicast content server 110 may, in at least some embodiments, differ from the content which is delivered by the VOD server 112 in that content which is delivered from the multicast content server 110 may not be configured to start from the beginning of the content. That is, the multicast content server 110 may simply allow a subscriber to tap into (e.g. begin viewing) an ongoing content stream. The multicast content server 110 receives source broadcast streams (i.e. via the content acquisition system 115) and multicasts or broadcasts such streams to receivers in real time or near real time. In contrast, at least some of the content delivered from the VOD server 112 may permit a subscriber to initiate viewing from the beginning of the content. Thus, in at least some embodiments, the multicast content server 110 is used to deliver broadcast content while the VOD server 112 is used to deliver on-demand content.

In at least some embodiments, the multicast content server 110 may be configured to deliver content to the receivers 104 using one or more transmission channels. Each transmission channel may represent a specific range of frequencies. The transmission channel may not, in all embodiments, be the same as a displayed channel. That is, receivers 104 may be configured to display a channel number as a displayed channel or virtual channel which does not necessarily represent the transmission channel associated with the displayed channel or virtual channel. Instead, the head end system 102 and/or the receiver 104 may include a channel map 191 which associates displayed channels (e.g. virtual channels) with corresponding transmission channels (e.g. ranges of frequencies). That is, the channel map 191 may map the channel numbers which are displayed to a user in a user interface of the receiver 104 with transmission channels. As will be explained in greater detail below, in at least some embodiments, the channel map 191 may not have a one-to-one mapping of displayed channels (i.e. virtual channels) to transmission channels. More particularly, in at least some example embodiments, a transmission channel may be associated with and mapped to more than one displayed channel.

The head-end system 102, in at least some embodiments, includes an interactive programming guide (IPG) server 114. The IPG server 114 is configured to process metadata associated with content. The metadata may be associated with on-demand content (such as the content which may be delivered by the VOD server 112) and/or broadcast/multicast content (such as the content which may be delivered by the multicast content server 110). The metadata may, for example, be stored in a programming data store 130. The programming data store 130 may include programming data such as the metadata associated with content and scheduling information. The scheduling information associates at least one virtual channel with content and/or with metadata for that content. The scheduling information may also include time and date information specifying the time and/or date when content will be available for broadcast/multicast. The metadata associated with broadcast or multicast content may be referred to as broadcast metadata.

The IPG server 114 may be configured to retrieve at least some of the metadata from a metadata service provider and store such metadata in the programming data store 130 of the head end system 102.

The IPG server 114 may be configured to provide programming data to receivers 104. Such programming data may include, for example, the scheduling information and metadata. The IPG server 114 may provide programming data regarding broadcast content (such as content available through the multicast content server 110) and may also be configured to provide programming data regarding on-demand content (such as content available through the VOD server 112) which is available for download to the receivers. For example, the IPG server 114 may be configured to provide to receivers 104 information regarding on-demand content stored in the content store 120. Such information may be referred to as on-demand content metadata. Metadata associated with broadcast content may be referred to as broadcast metadata. The on-demand content metadata and the broadcast metadata may, for example, include a description of content associated with the metadata including, for example, a title, summary, viewing time, and/or price associated with the metadata. The metadata may include other information instead of or in addition to the information specified above.

In order to facilitate communications between the head end system 102 and the receiver 104, the head end system 102 may include one or more communication subsystems (not shown) which are configured to control communications between the head end system 102 and the receivers 104. The specific design of the communication subsystems will depend on the transport mediums or transport protocols which are used for communications between the head end system 102 and the receivers 104.

In at least some example embodiments, the head end system 102 may be configured to control the allocation of fixed resources, such as bandwidth in the content delivery system 100 (FIG. 1), 101 (FIG. 2). In order to manage bandwidth, the head end system 102 may include one or more bandwidth management systems 116, 118 which are configured to manage bandwidth in the content delivery system 100 (FIG. 1), 101 (FIG. 2). In the embodiment illustrated, the VOD server 112 includes a VOD bandwidth management system 118 which is configured to manage bandwidth related to the delivery of on-demand content, such as video on-demand. Similarly, the multicast content server 110 includes a multicast bandwidth management system 116 which is configured to manage bandwidth related to the delivery of multicast/broadcast content.

While the multicast bandwidth management system 116 and the VOD bandwidth management system 118 are illustrated as separate features in the block diagram of FIG. 1, in various embodiments, these management systems 116, 118 may be combined together into a single bandwidth management system and/or incorporated into other features or systems of the head end system 102.

The multicast bandwidth management system 116 may, in some example embodiments, be a switched digital video (SDV) system. SDV is a system in which channels are only transmitted if they are needed. That is, if no receivers 104 are tuned into a virtual channel, then the content associated with that virtual channel is not transmitted. Instead, content will only be transmitted if a receiver 104 requests the content.

As will be discussed in greater detail below, in at least some embodiments, a bandwidth management system 116, 118 may be configured to locate duplicate content which is being transmitted or which is scheduled for transmission or requested for transmission through more than one transmission channel at a related time. Efficiencies may then be realized to reduce the amount of bandwidth required to transmit such redundant content.

For example, in at least some embodiments, the multicast bandwidth management system 116 is configured to located redundancies in broadcast content. For example, two television channels associated with two distinct sources (such as two networks or two regional stations associated with the same network) may be scheduled to air the same program at the same time. While in some cases advertising/commercial content associated with the program may differ, in at least some cases, the primary content (i.e. the show itself) may be the same.

Such redundancies may exist, for example, when the content delivery system 100 includes a plurality of regional channels. For example, the content delivery system 100 may provide access to two or more television feeds associated with the same television network but with different regional stations. For example, the content delivery system 100 may provide access to two ABC™ feeds, each associated with a different region (e.g. one may be associated with Detroit and one may be associated with Buffalo). At least some of the content which is scheduled to air on both of these feeds may be the same at various times.

Similarly, redundancies may exist where the content delivery system 100 provides access to source broadcast streams for networks associated with two different countries. For example, Canadian subscription based television systems (such as cable television systems) may provide access to both Canadian television networks and United States television networks. In some instances, this may result in a situation where two networks associated with two different countries are broadcasting the same content at the same time.

The transmission of such redundant content may eat up scarce bandwidth in the content delivery system 100. Accordingly, in at least some embodiments, the multicast bandwidth management system 116 is configured to identify at least some such redundancies and to remove some of the content from being transmitted. That is, the multicast bandwidth management system 116 may select one of the redundant streams of content to be of higher priority than another one of the redundant streams of content and may not transmit the lower priority redundant stream during the time when the redundancy exists. Instead, the multicast bandwidth management system 116 may allow receivers 104 which are requesting the content associated with the lower priority content stream to, instead, access the higher priority content stream.

Even when a lower priority redundant stream has been eliminated from transmission, the receivers 104 may be configured to appear to operate as though the redundant stream is still received. For example, the redundant content may be associated with multiple virtual channels. On the receiver 104, an interactive program guide (IPG) subsystem 188 (FIG. 4) may separately display multiple virtual channels associated the redundant content. Similarly, multiple channel numbers may be input into the receiver 104 to access the same content stream. This permits a user of the receiver 104 to request the content which was removed from transmission. When this happens, however, the user is provided with the other content, which was not removed from transmission (i.e. the higher priority content stream)

In at least some example embodiments, a VOD bandwidth management system 118 may be used to realize bandwidth efficiencies in the transmission of on-demand content. On-demand content is often unicast from the head end system 102 to the receiver 104 which requested it. However, in order to realize an efficiency and reduce the amount of bandwidth required to transmit on-demand content, in at least some example embodiments, when on-demand content is requested by a receiver, if that same content is already being unicast to a sufficient number of other receivers, then one or more of the prior unicasts of the content to those other receivers may be converted into a multicast of the content to two or more receivers which requested the same content. The receiver which recently requested the content will also be permitted to access the multicast. Since the multicast of content will not begin from the beginning of the content (i.e. it will begin from the point where enough receivers 104 wanted the same content to cause the unicast to be converted into a multicast), any receiver which requires earlier portions of the content (i.e. the portion of the content from the beginning to the point where the multicast began) may store the multicast portion of the content in a local content store 189 until it is needed (i.e. until playback of the content reaches the point which is included in the multicast portion of the content). The head end system 102 may unicast the portions of the content which preceded the multicast to any receivers which require this portion of the content. Such receivers may initially begin playback of the unicast content and may switch to the stored multicast content when playback reaches that portion of the content.

The bandwidth management systems 116, 118 may also be referred to as resource management systems.

The bandwidth management system 116, 118 will be discussed in greater detail below with reference to FIGS. 5 to 8.

The head end system 102 and/or any of the components, features or systems of the head end system 102 discussed herein, in at least some embodiments, include one or more processors and one or more memory elements storing computer executable instructions. In at least some embodiments, the head end system 102 and/or any of the components, features or systems of the head end system 102 may operate under stored program control and execute the computer executable instructions stored on the memory element(s).

Furthermore, any of the features of any of the systems included in the head end system 102 may be provided by other systems of the head end system 102 and any one or more of these features may be provided by other systems or subsystems of the head end system 102 not specifically discussed herein. More particularly, the head end system 102 may not be physically or logically divided in the manner illustrated in FIG. 3. In at least some embodiments, components of the head end system 102 may be physically or logically separated from one another. In at least some embodiments, the head end system 102 may be physically separated and may, for example, include a super head end system and one or more regional or local head end systems. The super head end system and/or the regional or local head end systems may separately or collectively perform some of the functions described above with reference to FIG. 3.

In at least some example embodiments, the head end system 102 may be a modular solution in which various functions or features described herein are provided by various modules. Such modules may, for example, be rack mounted electrical devices and may interconnect with one another to collectively provide functions and features described herein.

In at least some embodiments, one or more of the modules, features, systems or subsystems described herein may contain one or more processors and a memory having computer readable instructions stored thereon. The computer readable instructions may be executable by the processors and may cause the processors to provide functions described herein.

Example Receiver

Figure 4:
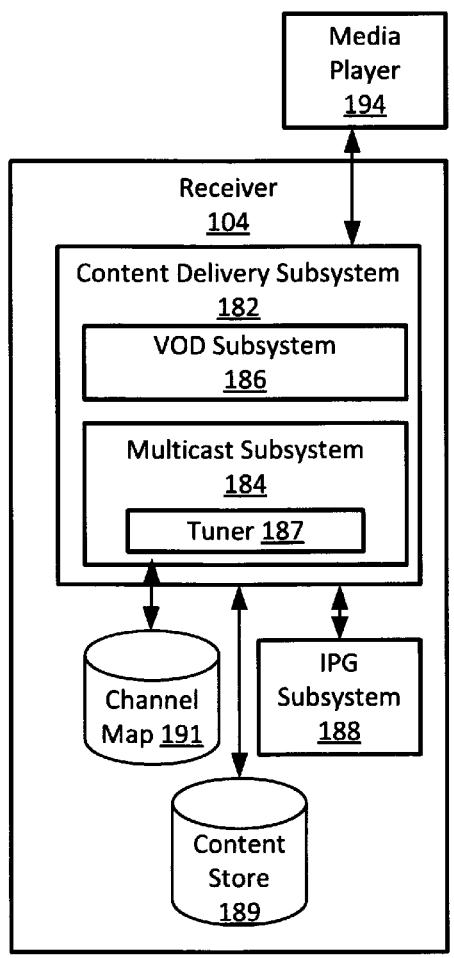
FIG. 4 is a block diagram of an example receiver for use with a content delivery system such as the content delivery systems of FIGS. 1 and 2.

Referring now to FIG. 4, an example receiver 104 in accordance with some example embodiments of the present disclosure is illustrated. The example receiver 104 may be configured to receive content from the head end system 102 of FIG. 3.

Receivers 104 operating within the broadcast domain 195 (FIGS. 1 & 2) may include features, systems and subsystems which interact with at least some of the features, systems and/or to subsystems of the head end system 102. For example, in at least some embodiments, a receiver 104 include an interactive programming guide (IPG) subsystem 188. The IPG subsystem 188 is configured to receive programming data from the IPG server 114 (FIG. 3). The IPG subsystem 188 may display programming data on the media player 194 associated with the receiver 104 (such as a television). The IPG subsystem 188 may allow a user of the receiver to interact with the IPG subsystem 188 through an input mechanism (such as a remote control) associated with the receiver 104. For example, the IPG subsystem 188 may be configured to display programming data (such as a schedule and metadata) for content which is available from the multicast content server 110 and/or display information (such as metadata) regarding on-demand content which is available from the VOD server 112.

The receiver 104 may also include a content delivery subsystem 182. The content delivery subsystem 182 is configured to receive content from the head end system 102 via the transport medium 197 and to display received content on a media player 194 which is coupled to the content delivery subsystem 182. The content delivery subsystem 182 may be configured to perform a plurality of content related tasks including, for example, decrypting received content, reformatting such content, displaying such content on the media player 194. The media player 194 may be a television or other display.

The content delivery subsystem 182 may be configured to handle broadcast content and may also be configured to handle on-demand content. In at least some embodiments, the content delivery subsystem 182 may include a video on-demand (VOD) subsystem 186 which is configured to handle on-demand video content. The Video on-demand (VOD) subsystem 186 allows a user to select content for presentation on-demand. In at least some embodiments, the VOD subsystem 186 allows a user to initiate a sending of content from the head end system 102 to the receiver 104 for display on a display associated with the receiver, such as a television. More particularly, the VOD subsystem 186 may be configured to receive a request for specific on-demand content to be delivered to the receiver 104. The request may be received through an input mechanism (such as a remote control) associated with the receiver 104. For example, a user of the receiver 104 may interact with a user interface of the receiver 104 using the input mechanism and may send a command to the receiver 104 via the input mechanism instructing the receiver to request the on-demand content from the head end system 102. In response to receiving such a command, the VOD subsystem 186 may send a request for the specified content to the VOD server 112 of the head end system 102. As discussed above, in response to receiving such a request, the VOD server 112 may retrieve the specified content and may send the specified content to the receiver 104 from which the request originated. In at least some embodiments, the VOD server 112 of the head end system 102 unicasts the on-demand content to the receiver 104. The VOD server 112 may perform other functions, such as, for example, posting a VOD charge to an account associated with the subscriber who the receiver is associated with. The receiver 104 then receives the selected content and may decrypt the received content and output the received content to the media player 194. That is, the content delivery subsystem 182 is configured to display the content on the media player 194 associated with the receiver 104.

The content delivery subsystem 182 may also include a multicast subsystem 184 which is configured to handle multicast content. More particularly, the multicast subsystem 184 may be configured to receive and process broadcast or multicast content which is sent from the head end system 102. The multicast subsystem 184 may be configured to decrypt received multicast content and to output the received content to the media player 194 (which may be a television). That is, the multicast subsystem 184 may be configured to display received multicast content on the media player 194 associated with the receiver 104.

The multicast subsystem 184 may be configured to tune into broadcast content at the request of a user of the receiver 104. For example, a user may input a command to the receiver 104 using an input mechanism (such as a remote control) associated with the receiver 104 to instruct the receiver 104 to tune into specified content. For example, the receiver 104 may receive a command instructing the receiver 104 to tune to a specified virtual channel. In response, the multicast subsystem 184 may tune into the content associated with the command. In at least some embodiments, the multicast subsystem 184 may include a tuner 187. The tuner 187 may be associated with channel map data 191 which may be stored in a data store of the receiver 104. The channel map data 191 may map a virtual channel (i.e. the channel number displayed to a user in a user interface of the receiver 104) to a transmission channel (i.e. the specific frequency or range of frequencies assigned to that channel). In response to receiving a command from an input mechanism instructing the receiver 104 to tune to a specified virtual channel, the tuner 187 may tune to the transmission channel associated with that virtual channel. The content which is received through that transmission channel may be decrypted and output to the media player 194 by the content delivery subsystem 182.

At least some receivers may include or be associated with a user input mechanism such as a remote control. The input mechanism may permit users to input commands to the receiver 104. For example, the input mechanism may permit users to interact with a user interface of the receiver 104. In various embodiments, users may, for example, use the input mechanism to navigate the interactive program guide provided by the IPG subsystem 188. In some embodiments, the input mechanism may allow users to input instructions to the receiver 104 to cause the receiver to receive specific content (i.e. by tuning to broadcast content using the tuner 187 or by sending an upstream request to the head end system 102 for on-demand content). The input mechanism may be useful for inputting additional commands to the receiver 104 which are not specifically discussed herein.

In at least some embodiments, the receiver 104 may be associated with a content store 189. The content store 189 may be provided in a memory which may be internal or external to the receiver 104. The content store 189 may be used for storing content, or parts thereof. As will be discussed in greater detail below, in at least some embodiments, the content store 189 may be used to store on-demand content which is being sent by the head end system 102 to another subscriber in the broadcast domain 195. That is, in order to save bandwidth in the broadcast domain 195, when on-demand content is being sent to a first receiver in the broadcast domain 195 and a second receiver in the broadcast domain then requests the same content while the content is still being transferred to the first receiver, then the head end system 102 may stop unicasting the content to the first receiver 104 and may begin multicasting the content to both the first receiver and the second receiver 104. Since the second receiver requested the content at a time which was later than the first receiver, the second receiver may not be ready to display the multicasted content at the time it is received since the second receiver must first display the portion of the content which was transmitted to the first receiver before the second receiver requested the content. Accordingly, the second receiver may store the content in the content store 189 for further playback.

The content store 189 may also be used, in at least some embodiments (not shown), by a digital video recorder (DVR) subsystem included in the receiver 104. The digital video recorder (DVR) subsystem may be configured to record received content. That is, the DVR subsystem may be configured to store received content in the content store 189 in response to a recording request received from a user via an input mechanism associated with the receiver 104.

In order to facilitate communications between the head end system 102 and the receiver 104, the receiver 104 may include one or more communication subsystems (not shown) which are configured to control communications between the head end system 102 and the receivers 104. The specific design of the communication subsystems will depend on the transport mediums or transport protocols which are used for communications between the head end system 102 and the receivers 104.

Receivers 104 and/or any of the components, features or systems of the receivers 104 discussed herein, in at least some embodiments, include one or more processors and one or more memory elements storing computer executable instructions. In at least some embodiments, the receiver 104 and/or any of the components, features or subsystems of the receiver 104 may operate under stored program control and execute the computer executable instructions stored on the memory element(s).

Furthermore, any of the features of any of the subsystems included in the receiver 104 may be provided by other systems of the receiver 104 and any one or more of these features may be provided by other systems or subsystems of the receiver 104 not specifically discussed herein. More particularly, components, features or subsystems of the receiver 104 may not be physically or logically divided in the manner illustrated in FIG. 4.

Bandwidth Management

Figure 5:
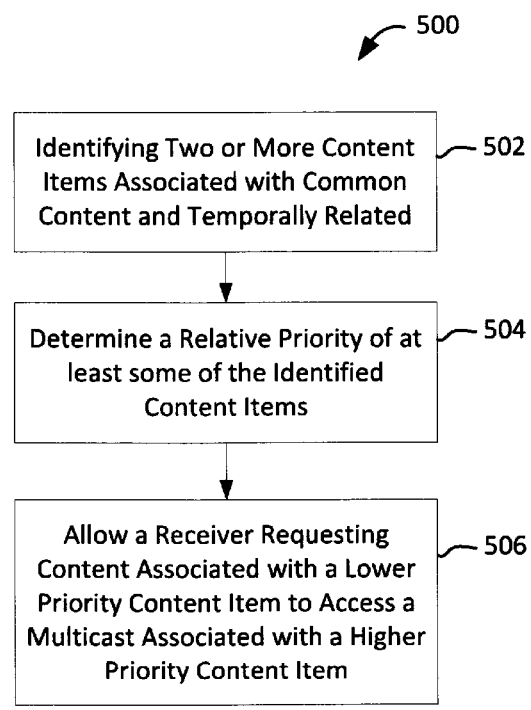
FIG. 5 is a flowchart of a method for managing bandwidth in accordance with example embodiments of the present disclosure.

Referring now to FIG. 5, an example embodiment of a method 500 for managing bandwidth in accordance with example embodiments of the present disclosure is illustrated in flowchart form.

One or more application or module stored in memory of the head end system 102 may be configured to perform the method 500 of FIG. 5. In at least some example embodiments, a bandwidth management system 116, 118 (FIG. 3) may be configured to perform the method 500 of FIG. 5. More particularly, one or more application or module in the head end system 102 and/or the bandwidth management system 116, 118 may contain computer readable instructions which cause a processor of the head end system 102 and/or a processor of the bandwidth management system 116, 118 to perform the method 500.

First, at 502, two or more content items which are associated with common content and which are temporally related are identified. Content items are related to a requested or planned transmission of content. As will be discussed in greater detail below with reference to FIGS. 6 and 7, content items may, in some embodiments, comprise programming data for broadcast streams (such as scheduling data and metadata). The bandwidth management system 116, 118 may use such programming data in order to determine whether there are any redundancies in the schedule. That is, bandwidth management system 116, 118 may determine whether there are any instances where there are two or more source broadcast streams received at a content acquisition system 115 of the head end system 102 which are both scheduled to deliver the same content at the same time.

In other embodiments, which will be discussed in greater detail below with reference to FIG. 8, a bandwidth management system 116, 118 may be configured to eliminate or reduce redundancies associated with the transmission of on-demand content. In such embodiments, content items may comprise requests for on-demand content which are received from two or more receivers 104 operating in the broadcast domain 195 (FIGS. 1 & 2). At 502, the bandwidth management system 116, 118 attempts to identify instances where the same content has been requested by multiple receivers 104. Where a later request for content from a receiver 104 is received at the head end system 102 while the same content is being transmitted to a receiver 104 from which an earlier request for the same content was received, then a redundancy is identified. That is, where there is some overlap in the content which both receivers (i.e. the receiver which issued the earlier request and the receiver which issued the later request) need to receive then a redundancy may be identified. Both receivers require the portion of the content being sent to the receiver which issued the earlier request.

Accordingly, at 502 content items associated with such redundancies may be identified.

Next, at 504, a relative priority of at least some of the identified content items is determined. More particularly, at least one of the content items is selected as a higher priority content item.

Next, at 506, a receiver requesting the content associated with a lower priority content item is allowed to access a multicast associated with a higher priority content item. In embodiments in which the content items represent programming data associated with source video feeds, a lower priority video feed may be eliminated from transmission. Instead, when a receiver would like to access the lower priority video feed, it may be forced to access the higher priority video feed.

Similarly, in embodiments in which the content items represent requests for on-demand content, a request for content which is received later than another request for the same content may be said to be a lower priority request than the earlier request. In such embodiments, at 506, the receiver 104 issuing the later request for the same content may be permitted to access a multicast of the content which is also being provided to the receiver issuing the earlier request.

Bandwidth Management in Multicast/Broadcast System

As noted in the discussion above, in at least some embodiments, the multicast bandwidth management system 116 is configured to located redundancies in broadcast content. For example, two television channels associated with two distinct source feeds (such as two networks or two regional stations associated with the same network) may be scheduled to air the same program at the same time. While in some cases advertising content (i.e. commercials) associated with the program may differ, in at least some cases, the primary content (i.e. the show itself) may be the same.

Such redundancies may exist, for example, when the content delivery system 100 includes regional channels. For example, the content delivery system 100 may provide access to two or more television feeds associated with the same television network but with different regional stations. For example, the content delivery system 100 may provide access to two ABC™ feeds, each associated with a different region (e.g. one may be associated with Detroit and one may be associated with Buffalo). At least some of the content which is scheduled to air on both of these feeds may be the same at various times.

Similarly, redundancies may exist where the content delivery system 100 provides access to television feeds for networks associated with two different countries. For example, Canadian subscription based television systems (such as cable television systems) may provide access to both Canadian television networks and United States television networks, both of which may broadcast the same primary content at the same time.

Figure 6:
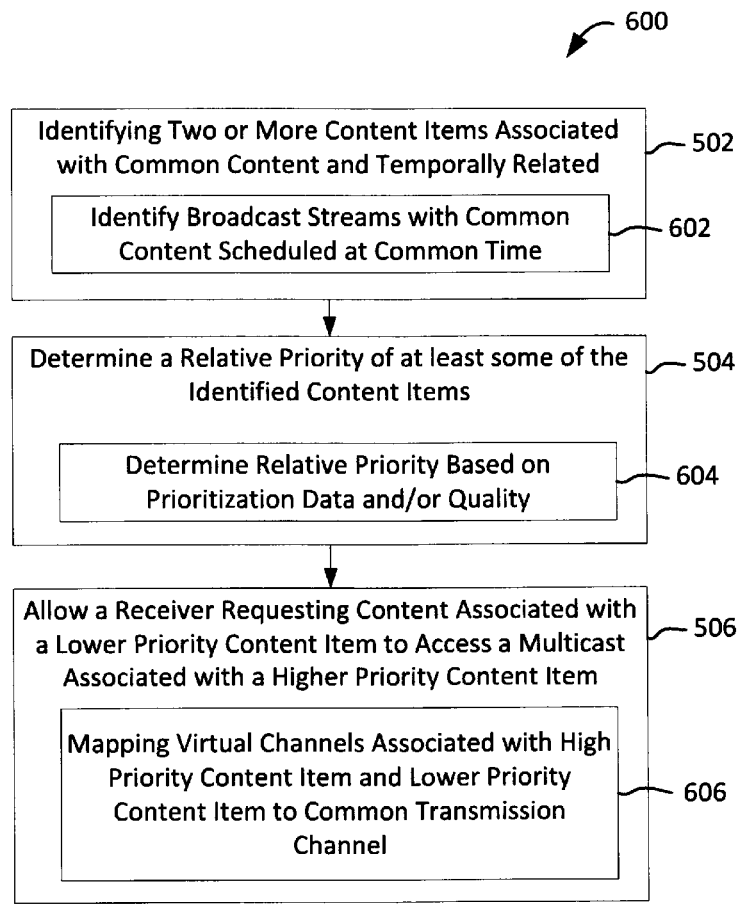
FIG. 6 is a flowchart of a method for managing bandwidth in accordance with example embodiments of the present disclosure.

Referring now to FIG. 6, an example embodiment of a method 600 for managing bandwidth in a multicast/broadcast system is illustrated in flowchart form. The method 600 of FIG. 6 may be used in order to eliminate or reduce at least some redundancies.

One or more application or module stored in memory of the head end system 102 may be configured to perform the method 600 of FIG. 6. In at least some example embodiments, a bandwidth management system 116, 118 (FIG. 3) may be configured to perform the method 600 of FIG. 6. More particularly, one or more application or module in the head end system 102 and/or the bandwidth management system 116, 118 may contain computer readable instructions which cause a processor of the head end system 102 and/or a processor of the bandwidth management system 116, 118 to perform the method 600. In at least some embodiments, a multicast bandwidth management system 116 may be configured to perform the method 600 of FIG. 6.

As with the embodiment of FIG. 5, at 502, two or more content items associated with common content and which are temporally related are identified. In the embodiment of FIG. 6, this comprises identifying two or more broadcast streams in which at least some common content is scheduled for broadcast at a common start time. That is, the temporal relationship may require that the content items be associated with the same start time. The common content may be a common television show, movie, sporting event, etc.

In at least some embodiments, such redundancies may be identified by parsing programming data associated with the broadcast streams. The programming data includes metadata and may also include scheduling data. The metadata for content associated with programming time slots may be parsed in order to identify instances where the same content is scheduled for broadcast on different source broadcast streams at the same start time. The start time is the time when the content is scheduled to begin to be broadcast on the source broadcast stream. Source broadcast streams are the broadcast feeds which are received at the head end system 102 (for example, via the content acquisition system 115).

In order to identify such redundancies, the metadata may be parsed to identify feeds with common metadata. In various embodiments, any one or more of the following may be interpreted as indicia that the content being broadcast on different content feeds is the same: common program names, common episode names and/or episode numbers, and/or common or similar show descriptions. Other indicia may also be possible.

In at least some embodiments, whether content associated with two or more broadcast streams will be said to be redundant will depend, at least in part, on a content-type associated with the content. For example, in at least some embodiments, the bandwidth management system 116, 118 may be configured to ignore any news related content in step 502. Since news programming often varies from jurisdiction to jurisdiction, it may be erroneous to conclude that two instances of source broadcast streams which are scheduled to carry "News" are redundant.

Other content-types or features associated with content may also be used to exclude such content from being found to be redundant. That is, the bandwidth management system 116, 118 may be configured to exclude at least some content items (i.e. programming data) from being identified as being associated with redundant content (i.e. content which is scheduled to be broadcast on more than one broadcast stream at the same time) based on one or more exclusionary rules.

If a redundancy is located at 502, at 504, a relative priority of at least some of the content items associated with the redundant scheduled broadcast is determined. This may include, at 604, determining a relative priority based on prioritization data and/or quality. Prioritization data is data which specifies one or more prioritization rules to follow when such redundancies are located. That is, the prioritization data specifies the relative priorities of two or more broadcast streams (including the source broadcast streams associated with the redundancy identified at 602). In at least some embodiments, the prioritization data specifies one or more broadcast streams which are to be preferred over one or more other broadcast streams.

In some embodiments, the prioritization data may be signal substitution data. Signal substitution data specifies that content items associated with one or more local broadcast streams are to be prioritized higher than content items associated with one or more foreign broadcast streams. Signal substitution data may be used, for example, where the content delivery system 100 provides access to television feeds for networks associated with two different countries. For example, Canadian subscription based television systems (such as cable television systems) may provide access to both Canadian television networks and United States television networks. Signal substitution data may specify that, when the same content is scheduled for broadcast on both a foreign broadcast stream and a domestic broadcast stream, then the content items associated with the domestic broadcast stream may be granted a higher priority than the content items associated with a foreign broadcast stream.

In at least some example embodiments, when a redundancy is located at 502, at 604, the relative priorities of the content items associated with the redundancy may be determined based on the signal quality of the source broadcast streams associated with these content items. The signal quality may be measured by a signal quality sensor provided in the head end system 102. In at least some embodiments, a content item associated with a source broadcast stream having a higher signal quality may be granted a higher priority than a content item associated with a source broadcast stream having a lower relative signal quality.

In at least some embodiments, a combination of these prioritization techniques may be employed at 604. For example, if the prioritization data specifies one or more rules, then these prioritization rules may be followed. However, where no such rules are specified, then the prioritization may be performed in accordance with the signal quality.

Next, at 506, the bandwidth management system 116, 118 allows a receiver requesting content associated with a lower priority content item to access a multicast associated with the higher priority content item. The multicast may be a broadcast.

In at least some embodiments, such as the embodiment illustrated in FIG. 6, this may include, at 606, mapping a virtual channel associated with a higher priority content item and a virtual channel associated with a lower priority content item to a common transmission channel during the time when the two or more content items are associated with at least some common content. That is, during the period of time when the broadcast streams were scheduled to include the same content, the broadcast stream which has been prioritized lower than the other broadcast stream (i.e. the broadcast stream which is associated with the lower priority content item) will be removed from being transmitted in the broadcast domain 195 (FIGS. 1 and 2).

That is, the multicast bandwidth management system 116 may select one of the redundant streams of content to be of higher priority than another one of the redundant streams of content and may not transmit the lower priority redundant stream during the time when the redundancy exists. Instead, the bandwidth management system 116, 118 may be configured to allow receivers 104 which are requesting the content associated with the lower priority content stream to, instead, access the higher priority content stream.

Even when a lower priority redundant stream has been eliminated from transmission, the receivers 104 may be configured to appear to operate as though the redundant stream is still received. For example, the redundant content may be associated with multiple virtual channels. On the receiver 104, an interactive program guide (IPG) subsystem 188 may separately display multiple virtual channels associated the redundant content. That is, a user of the receiver 104 may be unable to determine that one of the broadcast streams is no longer available. However, when a user requests content which is associated with the lower priority content item (i.e. when the user requests the content associated with the content stream which was removed) and when a user requests content associated with the higher priority content item (i.e. when the user requests the content associated with the content stream which was not removed), the same content stream will be provided to the receiver 104. That is, in either case, the user will be directed to the same transmission channel.

In at least some embodiments, in order to allow a receiver requesting content associated with a lower priority content item to access a multicast associated with a higher priority content item (i.e. to facilitate 506), the head end system 102 may provide a channel map 191 (FIG. 4) to the receiver 104. The channel map 191 may map a virtual channel (e.g. the channel which is displayed to a user of the receiver) to a transmission channel (e.g. the frequency or range of frequencies used to transfer content associated with that virtual channel). As a result of the elimination of the redundant transmission, the channel map 191 may map two virtual channels to the same transmission channel.

In at least some embodiments, the channel map 191 may be a scheduled channel map. That is, the mapping of virtual channels to transmission channels may be time dependent and may vary over time. For example, when the redundancy on two broadcast streams ceases, each broadcast stream may again be granted a separate transmission channel and the channel map may then specify that the virtual channels associated with these items are again associated with different transmission channels.

Figure 7:
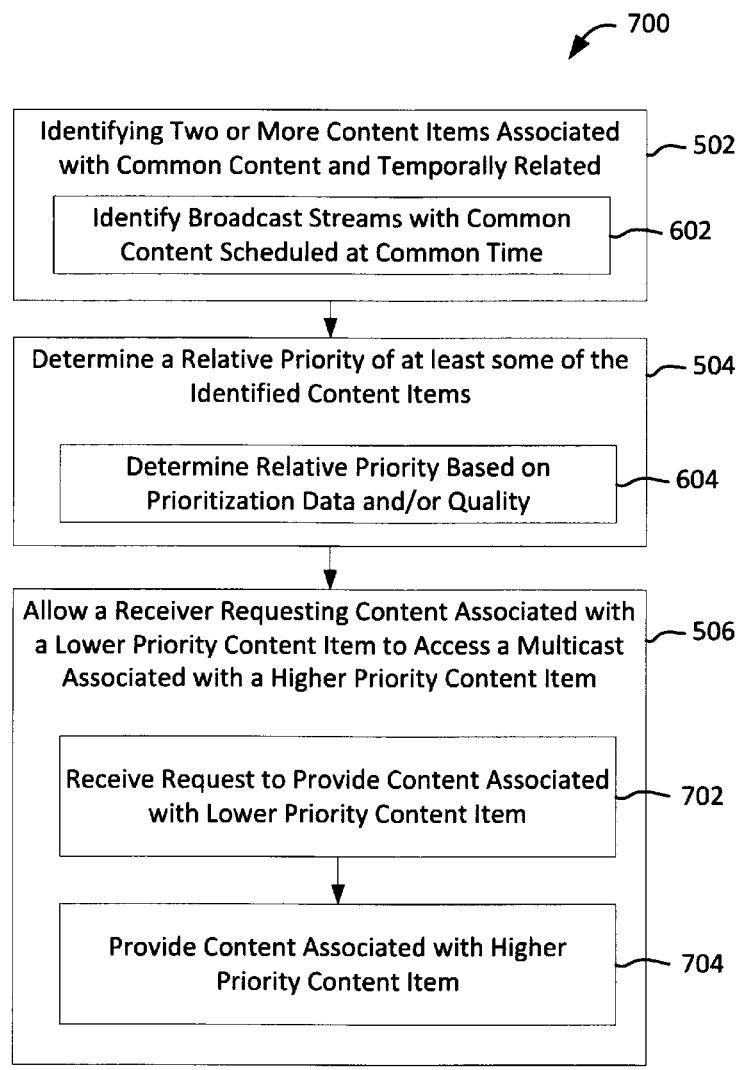
FIG. 7 is a flowchart of a method for managing bandwidth in accordance with example embodiments of the present disclosure.

Referring now to FIG. 7, in at least some embodiments, the bandwidth management system 116 may operate within or in conjunction with a switched digital video (SDV) system. SDV is a system in which channels are only transmitted if they are needed. That is, if no receivers 104 are tuned into a channel, then the content associated with that channel is not transmitted. Instead, content will only be transmitted if a receiver 104 requests the content. Accordingly, in an SDV system when a user requests broadcast content on a receiver 104 (e.g. by tuning into a virtual channel), the receiver typically sends a signal to the head end system 102. If the broadcast stream associated with the request was not previously being transmitted (i.e. if no other receivers 104 were tuned into that same content), then the SDV system operating in the head end system 102 will activate that broadcast stream. That is, the SDV system will begin to transmit that broadcast stream in an available transmission channel. The SDV system may then inform the receiver 104 which requested the content of the transmission channel where that content is now located.

In FIG. 7, at example embodiment of a further method 700 for managing bandwidth in a multicast/broadcast system is illustrated in flowchart form. The method 700 of FIG. 7 may be used in order to eliminate or reduce at least some redundancies. The method 700 of FIG. 7 may be provided within or used with an SDV system. The method 700 of FIG. 7 includes many features 502, 602, 504, 604 discussed above with reference to FIG. 6.

One or more application or module stored in memory of the head end system 102 may be configured to perform the method 700 of FIG. 7. In at least some example embodiments, a bandwidth management system 116, 118 (FIG. 3) may be configured to perform the method 700 of FIG. 7. More particularly, one or more application or module in the head end system 102 and/or the bandwidth management system 116, 118 may contain computer readable instructions which cause a processor of the head end system 102 and/or a processor of the bandwidth management system 116, 118 to perform the method 600. In at least some embodiments, a multicast bandwidth management system 116 may be configured to perform the method 700 of FIG. 7. In at least some embodiments, a switched digital video (SDV) system may be configured to perform the method 700 of FIG. 7.

In the method 700 of FIG. 7, in order to allow a receiver requesting content associated with a lower priority content item to access a multicast associated with a higher priority content item (at 506), a request is received at the SDV system/bandwidth management system 116, 118 (at 702). The request is received from a receiver 104 operating in the broadcast domain 195 (FIGS. 1 and 2). The request is a request to provide content associated with a lower priority content item. That is, the request is a request which is associated with the content removed from broadcast.

In response to receiving such a request, at 704, the SDV system/bandwidth management system 116, 118 provides content associated with the higher priority content item to the receiver 104. In at least some embodiments, at 704, the SDV system/bandwidth management system informs the receiver of the transmission channel where the content associated with the higher priority content item is being transmitted. That is, the SDV system/bandwidth management system 116, 118 instructs the receiver to tune into a frequency associated with the transmission channel used for transmitting the content associated with the higher priority content item. If this content was not previously being transmitted, the SDV system/bandwidth management system 116, 118 may first begin the transmission on an available transmission channel.

Bandwidth Management in On-Demand System

As noted in the discussion of the head end system 102 above, in at least some example embodiments, a VOD bandwidth management system 118 may be used to realize bandwidth efficiencies in the transmission of on-demand content.

Redundancies may exist in the delivery of on-demand content where two receivers require common content or a common portion thereof. On-demand content is often unicast from the head end system 102 to the receiver 104 which requested it. That is, in some systems, in response to each request for on-demand content which is received from a receiver 104, a head end system 102 will begin a separate unicast of the content to the receiver 104 which requested it. A redundancy exists where one receiver requests content while another receiver is receiving the same content via unicast. That is, where a request is received from a first receiver and a unicast to that first receiver is begun, and a request for the same content is subsequently received from a second receiver while the unicast to the first receiver is ongoing, a bandwidth savings may be achieved by converting the unicast to the first receiver into a multicast to both receivers. That is, the fact that those requests relate to the same content and the fact that the second request was received while the content was still being sent to the first receiver results in a redundancy if the content is unicast in its entirety to both the first receiver and the second receiver. Since both receivers require the portion of the content which is yet to be delivered to the first receiver, this content may be multicast to both receivers and stored in local storage on the second receiver until it is needed.

An overview having been provided, reference will now be made to FIG. 8 which illustrates, in flowchart form, an example embodiment of a method 800 for managing bandwidth in an on-demand system.

Figure 8:
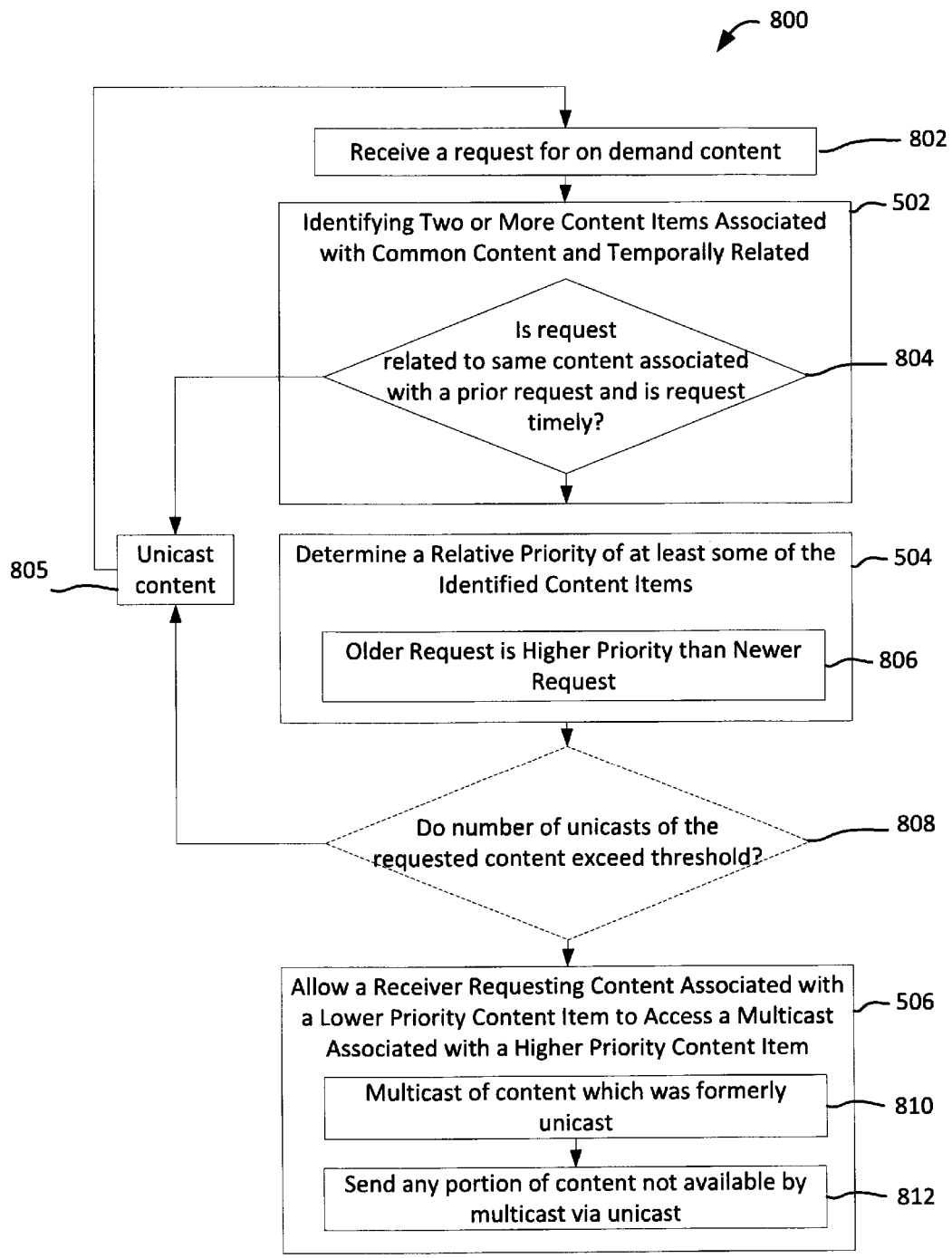
FIG. 8 is a flowchart of a method for managing bandwidth in accordance with example embodiments of the present disclosure.

One or more application or module stored in memory of the head end system 102 may be configured to perform the method 800 of FIG. 8. In at least some example embodiments, a bandwidth management system 116, 118 (FIG. 3) may be configured to perform the method 800 of FIG. 8. More particularly, one or more application or module in the head end system 102 and/or the bandwidth management system 116, 118 may contain computer readable instructions which cause a processor of the head end system 102 and/or a processor of the bandwidth management system 116, 118 to perform the method 800. In at least some embodiments, an on-demand bandwidth management system 118 may be configured to perform the method 800 of FIG. 8.

First, at 802, a request for on-demand content may be received at the head end system 102 from a receiver 104.

As with the embodiment of FIG. 5, at 502, two or more content items associated with common content and which are temporally related are identified. In the embodiment of FIG. 8, the content items comprise requests for content received from two or more receivers 104. These requests include the recent request received at 802. At 804, the bandwidth management system 116, 118 determines whether the recent request (i.e. the request received at 802) is related to the same content as a prior request for on-demand content. That is, the bandwidth management system 116, 118 determines whether the receivers have requested the same content. The bandwidth management system 116, 118 also determines whether the recent request is timely in relation to the prior request for the same on-demand content.

In order to be considered timely (and thus temporally related to an earlier request), a more recent request must be received while content is still being transmitted to the receiver associated with the earlier request.

In at least some embodiments, if the more recent request is received while content is still being transmitted to the receiver associated with the earlier request, then the content will be considered to be timely and temporally related to the earlier request. That is, in at least some embodiments, two or more content items are determined to be associated with at least some common content and temporally related if a request for content is received from a receiver during the transmission of the same content to another receiver. In other embodiments, a further requirement may be required before a request may be said to be timely and temporally related to the earlier request. For example, in some embodiments, in order to be considered timely, the portion of the content which remains to be transmitted in relation to the earlier request must exceed a threshold. The threshold may be a predetermined threshold and may be specified in terms of a time duration. For example, in order to be considered timely and temporally related to an earlier request, a later request must be received while the portion of the content which has not yet been transmitted to the receiver in relation to the earlier request is greater than a predetermined period of time (such as a predetermined number of minutes).

If the later request is not related to the same content as an earlier request or if the later request is not timely (i.e. not sufficiently temporally related to the earlier request), then at 805, the requested content may be unicast to the receiver from which the later request was received (i.e. the receiver which sent the request received at 802).

Next, in at least some embodiments, at 504 a relative priority of at least some of the content items may be determined by the bandwidth management system 116, 118. That is, the requests may be prioritized. In the embodiment of FIG. 8, the earlier request which is related to the same content as the later request is assigned a higher priority than a later request (at 806). In feature 504 and 806 of the method 800 of FIG. 8, the bandwidth management system 116, 118 selects the request which was received from a receiver 104 which only requires a portion of the content which is also required by the other receiver 104. This request will be the earlier of the requests identified at 502. Accordingly, at 806, the earlier of the requests identified at 502 is assigned a higher relative priority than the later of these requests. That is, a first request for content is assigned a higher priority than a second request for content if the first request for content was received prior to the second request for content.

In at least some embodiments, the method 800 may then proceed to 506 in which the bandwidth management system 116, 118 allows a receiver requesting content associated with a lower priority content item to access a multicast associated with the higher priority content item.

In at least some embodiments, 506 may include (at 810) initiating a multicast of content which was formerly unicast. That is, in order to realize an efficiency and reduce the amount of bandwidth required to transmit on-demand content, in at least some example embodiments, when on-demand content is requested by a receiver, if that same content is already being unicast then one or more of the prior unicasts of the content to those other receivers (i.e. the receivers associated with the higher priority request) may be converted into a multicast of the content to receivers which requested the same content. The receiver which recently requested the content will be permitted to access the multicast.

Since the multicast of content will not begin from the beginning of the content (i.e. it will begin from the point where the enough receivers 104 wanted the same content to cause the unicast to be converted into a multicast), any receiver which requires earlier portions of the content (i.e. the portion of the content from the beginning to the point where the multicast began) may store the multicast portion of the content in a local content store 189 until it is needed (i.e. until playback of the content reaches the point which is included in the multicast portion of the content). At 812, the head end system 102 may unicast the portions of the content which preceded the multicast to any receivers which require this portion of the content. Such receivers may be configured to initially begin playback of the unicast content and then switch to the stored multicast content when playback reaches that portion of the content.

In at least some embodiments, before multicasting is performed at 506, a further check is performed at 808 to ensure that the number of unicasts of the requested content exceeds a threshold. In at least some embodiments, the multicast at 506 will not be initiated where there was only one receiver which was previously receiving the content via unicast. Instead, the bandwidth management system 116, 118 may require that a greater number of receivers 104 are receiving the content before it will determine that the bandwidth savings in switching to a multicast of at least part of the content justify the switch. For example, in at least some embodiments, multicasting will only begin if there are already two unicasts of the same content. That is, multicasting will only begin if there will be at least three receivers 104 which will access the multicast. If the number of unicasts does not exceed the threshold, then the content may be unicasted to the receiver from which the request was received at 802.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of managing bandwidth in a content delivery system, the method comprising:
   identifying two or more content items which are associated with at least some common content and which are temporally related;
   determining a relative priority of at least some of the identified content items; and
   allowing a receiver requesting the content associated with a lower priority content item to access a multicast associated with a higher priority content item,
   wherein allowing a receiver requesting the content associated with a lower priority content item to access a multicast associated with a higher priority content item comprises mapping a virtual channel associated with the higher priority content item and a virtual channel associated with the lower priority content item to a common transmission channel during a time when the two or more content items are associated with at least some common content.

2. The method of claim 1, wherein identifying two or more content items which are associated with at least some common content and which are temporally related comprises:
    identifying two or more broadcast streams in which at least some common content is scheduled for broadcast at a common start time.

3. The method of claim 2, wherein the content items comprise programming data for a plurality of broadcast streams and identifying two or more broadcast streams in which at least some common content is scheduled for broadcast at a common time comprises parsing the programming data.

4. The method of claim 2, wherein determining a relative priority of at least some of the identified content items comprises:
    determining the relative priority of at least some of the identified content items with reference to prioritization data, the prioritization data specifying relative priorities of two or more broadcast streams.

5. The method of claim 4, wherein the prioritization data is signal substitution data which specifies that content items associated with one or more domestic broadcast streams are to be prioritized higher than content items associated with one or more foreign broadcast streams.

6. The method of claim 2, wherein allowing a receiver requesting the content associated with a lower priority content item to access a multicast associated with a higher priority content item comprises:
    receiving, from a receiver during the time when the two or more broadcast streams associated with common content are being broadcast, a request to provide content associated with the lower priority content item to the receiver and, in response, providing the content associated with the higher priority content item to the receiver.

7. The method of claim 6, wherein providing the content associated with the higher priority content item to the receiver comprises:
    instructing the receiver to tune into a frequency associated with a transmission channel used for transmitting the content associated with the higher priority content item.

8. The method of claim 2, wherein determining a relative priority of at least some of the content items comprises:
    determining a signal quality of the content associated with the identified content items; and
    determining a relative priority of at least some of the content items based on the signal quality of the content associated with the content items.

9. A bandwidth management system comprising:
    at least one processor;
    a memory coupled to the at least one processor, the memory having stored thereon processor executable instructions which, when executed by the processor cause the processor to:
    identify two or more content items which are associated with at least some common content and which are temporally related;
    determine a relative priority of at least some of the identified content items; and
    allow a receiver requesting the content associated with a lower priority content item to access a multicast associated with a higher priority content item,
    wherein allowing a receiver requesting the content associated with a lower priority content item to access a multicast associated with a higher priority content item comprises mapping a virtual channel associated with the higher priority content item and a virtual channel associated with the lower priority content item to a common transmission channel during a time when the two or more content items are associated with at least some common content.

10. The bandwidth management system of claim 9, wherein identifying two or more content items which are associated with at least some common content and which are temporally related comprises:
    identifying two or more broadcast streams in which at least some common content is scheduled for broadcast at a common start time.

11. The bandwidth management system of claim 9, wherein the content items comprise programming data for a plurality of broadcast streams and identifying two or more broadcast streams in which at least some common content is scheduled for broadcast at a common time comprises parsing the programming data.

12. The bandwidth management system of claim 9, wherein determining a relative priority of at least some of the identified content items comprises:
    determining the relative priority of at least some of the identified content items with reference to prioritization data, the prioritization data specifying relative priorities of two or more broadcast streams.

13. The bandwidth management system of claim 12, wherein the prioritization data is signal substitution data which specifies that content items associated with one or more domestic broadcast streams are to be prioritized higher than content items associated with one or more foreign broadcast streams.

14. The bandwidth management system of claim 9, wherein allowing a receiver requesting the content associated with a lower priority content item to access a multicast associated with a higher priority content item comprises:
    receiving, from a receiver during the time when the two or more broadcast streams associated with common content are being broadcast, a request to provide content associated with the lower priority content item to the receiver and, in response, providing the content associated with the higher priority content item to the receiver.

15. The bandwidth management system of claim 14, wherein providing the content associated with the higher priority content item to the receiver comprises:
    instructing the receiver to tune into a frequency associated with a transmission channel used for transmitting the content associated with the higher priority content item.

16. The bandwidth management system of claim 9, wherein determining a relative priority of at least some of the content items comprises:
    determining a signal quality of the content associated with the identified content items; and
    determining a relative priority of at least some of the content items based on the signal quality of the content associated with the content items.

* * * * *